United States Patent [19]
Grady

[11] 3,799,724
[45] Mar. 26, 1974

[54] APPARATUS FOR PRETZEL MANUFACTURE

[76] Inventor: Francis J. Grady, R.D. No. 4, Reading, Pa. 18606

[22] Filed: Feb. 9, 1972

[21] Appl. No.: 224,843

[52] U.S. Cl.............. 425/311, 425/190, 425/465, 99/86
[51] Int. Cl............................................ A21c 11/16
[58] Field of Search .......... 425/287, 309, 311, 190, 425/382, 455, 461, 131, 133, 462, 463, 464, 465; 99/86

[56] References Cited
UNITED STATES PATENTS 2,660,131  11/1953  Elliott.................................. 425/94
3,415,206  12/1968  Reisman ............................ 425/311

Primary Examiner—R. Spencer Annear
Attorney, Agent, or Firm—Synnestvedt & Lechner

[57] ABSTRACT

An extrusion head for an extrudable material, such as a food product dough, which is to be formed into a special shape, such as a pretzel configuration. The head includes a die and associated parts which are of such character and construction that portions of the extruded material will differ in width and thickness from other portions.

3 Claims, 7 Drawing Figures

PATENTED MAR 26 1974  3,799,724
SHEET 1 OF 2
FIG. 1
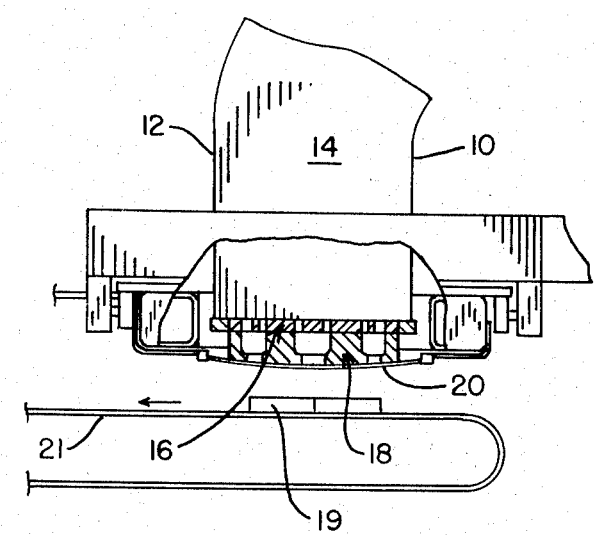
FIG. 2
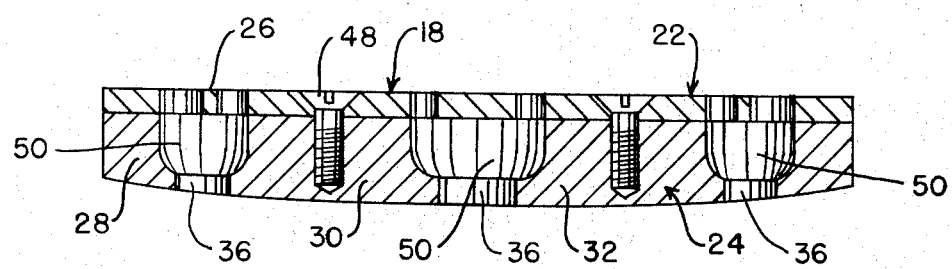
FIG. 6
FIG. 7
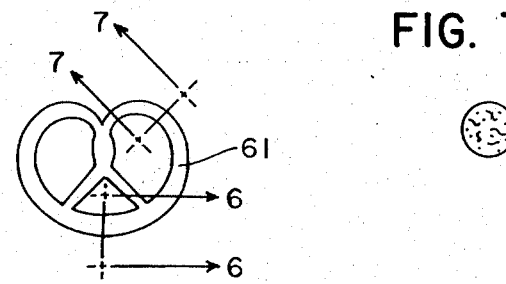
FIG. 5

APPARATUS FOR PRETZEL MANUFACTURE

BACKGROUND OF THE INVENTION

In the production of food products such as pretzels, historically the dough has been rolled into an extended cylindrical form and then twisted or tied by hand into the pretzel configuration. Such operations are relatively slow and laborious. As an approach to expedition in the pretzel-forming operation, it has been known to employ machines which, in effect, simulate the manual pretzel-twisting or tying movements. In such prior methods, whether they be performed by hand or by machine, the elongated cylinders of rolled dough may be varied in diameter prior to the pretzel-tying operation to produce pretzels having portions of different diameters such as, for example, pretzels known in the trade as "Bavarian," "Dutch" or "Husky" pretzels.

A more recent development has been the use of extrusion-type machines which are inherently faster in operation than either the hand method or the machines which simulate the hand method. The extrusion-type machines include extrusion heads incorporating dies through which the pretzel dough is extruded for a predetermined length of time to attain the desired thickness and then severed from the die to drop upon a conveyor by which it is carried to the baking oven. The dough rises and assumes a circular cross-sectional shape during its conveyance. Such apparatus is exemplified by the machines disclosed in U. S. Pat. No. 2,660,131 issued Nov. 24, 1953, and U. S. Pat. No. 3,415,206 issued Dec. 10, 1968, and also by the machine illustrated in my copending application Ser. No. 173,972 filed Aug. 23, 1971. While the extrusion machines operate efficiently in the production of pretzels in which the various parts are substantially of uniform cross-section, they have not heretofore been capable of producing pretzels in which the various parts vary in cross-section as exemplified by the so-called Bavarian, Dutch and Husky-type pretzels referred to above.

SUMMARY OF THE INVENTION

A principal object of the instant invention is the provision of extrusion apparatus and a method for the production of pretzels or the like which provides for variations in the cross-sectional areas of different parts of the pretzels.

Another object of the invention is the provision of an extrusion apparatus fulfilling the foregoing object which incorporates an extrusion head having means for varying the width and rate of flow of the dough material through different portions of the extruding die.

The foregoing and other objects of the invention, which will become apparent, are attained by an extrusion apparatus including an extrusion head and means to sever the extruded dough, the latter suitably being of the construction disclosed in my said copending application Ser. No. 173,972 filed Aug. 23, 1971, the extrusion head being of such character that after a given time interval of the extrusion operation, the extruded dough will vary both in thickness and in width in accordance with the desired pattern. To achieve this result, an extrusion head of basically conventional form is employed, the extrusion head being generally of the type disclosed, for example, in the patents and copending application previously referred to. Thus, it includes a die plate composed of a plurality of individual sections secured to an overlying strainer or entry plate, the individual die sections being in spaced relationship to define the die orifices. The die orifices lead from a dough cavity formed in the die plate, the dough cavity conforming generally to the shape of the die openings but being of greater width. The dough entry or strainer plate to which the die sections are secured has a plurality of cylindrical dough passageways overlying and in the same pattern as the dough cavity.

In accordance with the instant invention and to produce the results referred to above, the spacing of the individual die sections to define the die openings varies in different parts of the assembled structure to provide die openings or apertures which correspondingly vary in width. Also, the dough passageways of the strainer plate are so varied in diameter and frequency that a faster flow of dough through the die openings is obtained in certain portions of the die pattern than in others, whereby for each cycle of operation a correspondingly varying thickness of extruded dough will be obtained. More specificially, the diameters of the dough passageways and their frequency and location are such that the portions of the extruded dough of greater width will generally also be of greater thickness, wherby as the dough rises following its extrusion, variations in the diameter of cross-sectional areas of the pretzel in different parts thereof will occur.

BRIEF DESCRIPTION OF THE DRAWINGS

FIG. 1 is an end elevational view with parts broken away for clearness of illustration, and with parts in section, of a dough-extruding device in accordance with the instant invention;

FIG. 2 is a view on an enlarged scale of the die head portion of the device as shown in FIG. 1;

FIG. 5 is a plan view of a pretzel as produced by the use of the die head of the instant invention;

FIG. 6 is a sectional view on an enlarged scale taken on the line 6—6 of FIG. 5 looking in the direction of the arrows; and FIG. 7 is a sectional view on an enlarged scale taken on the line 7—7 of FIG. 5 looking in the direction of the arrows.

DETAILED DESCRIPTION OF THE DRAWINGS

Figure 3:
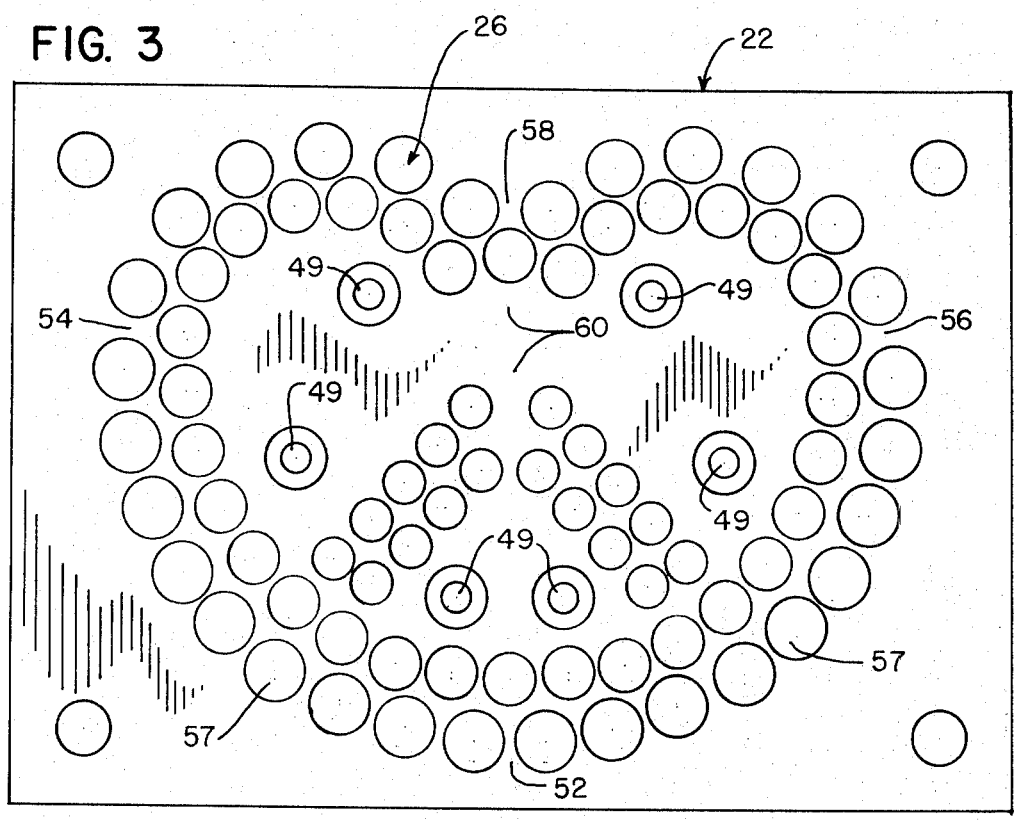
FIG. 3 is a top plan view on an enlarged scale of the dough entrance plate of the die head of FIG. 2.

Referring particularly to FIGS. 1 and 2, a dough-extrusion apparatus incorporating the die head of the instant invention is illustrated, the apparatus, except for the features of the die head hereinafter to be described in detail, suitably corresponding to that disclosed in my copending application Ser. No. 173,972 filed Aug. 23, 1971, previously referred to. The parts shown include a dough-receiving chamber 10 defined by side plates 12 and end plates 14, only one of the latter being shown, the chamber terminating in a vertical portion leading to the dough-extrusion head 16 of the machine. A horizontal portion of the chamber (not shown) leads from and is supported by a hopper (not shown) into which the dough is placed and then forced into the chamber by suitable means, such as screw conveyors (not shown).

The lower end of the chamber is closed by the extrusion head 16, which may suitably be comprised of a series of die heads 18 secured in any suitable way to the walls of the chamber. The construction of the individual die heads will hereinafter be described in detail.

A dough-severing or cutting mechanism, which may be of the construction disclosed in my said copending application or of any other suitable type, includes cutting blades 20, there being a blade for each die head 16, adapted for reciprocation across the lower face of the die head, the lower face suitably being of somewhat convex configuration, as disclosed in my said prior application. In one direction of reciprocation, namely in the cutting stroke, a cutting edge of the blade is held in contact with the curved lower face of the die head and suitably upon its return stroke is removed from said lower face to permit continued extrusion of the dough, all as described in my said copending application. The cutting blade moves through its cutting stroke at fixed intervals, the intervals being of such duration as to permit the desired amount of dough to be extruded through the die head. A belt conveyor 21 of any suitable type is located below the die heads in relatively close proximity thereto for the reception of the extruded and cut-off dough shapes 19. Conveyor 21 is mounted for traveling movement, as in the direction indicated by the arrow, by any suitable means (not shown) to carry the dough shapes to a suitable point for further processing, such as baking, the dough rising during its transmittal with the major portions of the shape assuming an approximately circular cross-section.

Figure 4:
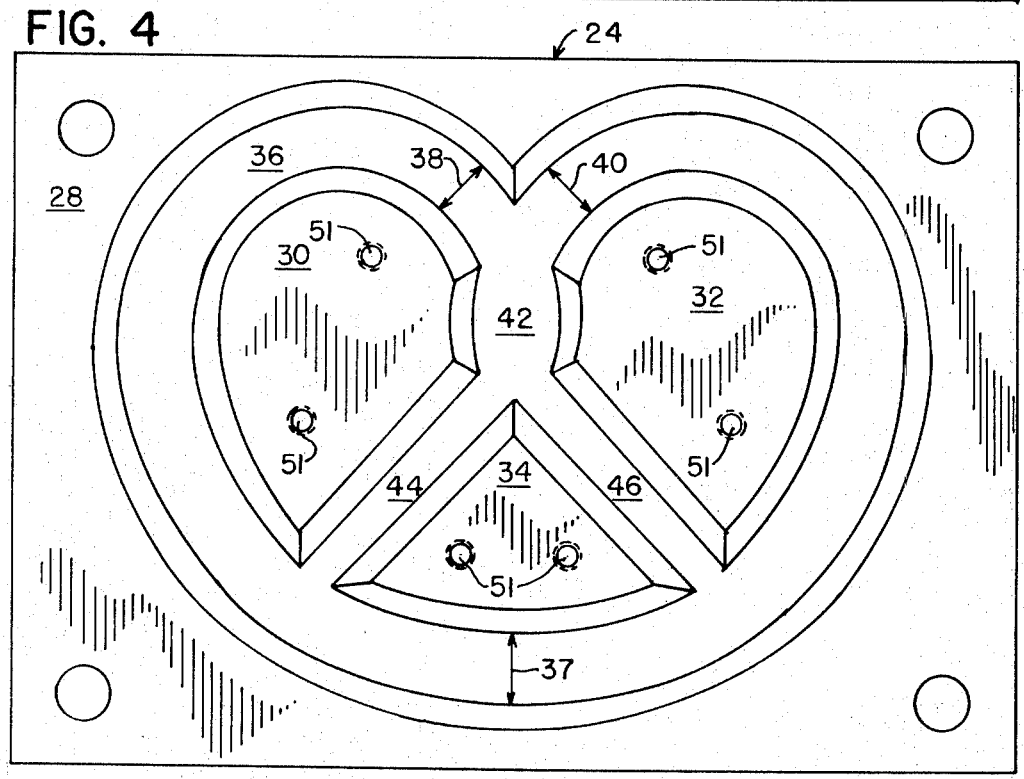
FIG. 4 is a top plan view on an enlarged scale of the die plate of the die head of FIG. 2.

Referring now particularly to FIGS. 2 to 4 inclusive, each die head is composed of a dough entrance plate 22 and a die plate 24. Entrance plate 22 is a single steel plate or the like containing a multiplicity of dough-transmitting apertures or openings 26, as will hereinafter be described in detail. Die plate 24, which determines the actual shape of the extruded product, is composed of a plurality of sections of steel plate or other rigid material including an outer section 28 and inner sections 30, 32 and 34, the latter being spaced from each other and from the outer plate to define a continuous dough-extruding die orifice or slot 36 of pretzel configuration. As illustrated particularly in FIG. 4, in accordance with the instant invention, the width of the die orifice gradually varies from a greatest width at a point 37 in both directions to portions of lesser width at points 38 and 40 where the two portions join to define an extrusion portion 42 for what is termed the "knot" of the pretzel. From portion 42, relatively narrow orifices or slots 44 and 46, suitably of uniform width and preferably approximately one-half the width of the orifice at point 37, lead to and connect into the orifice portions at opposite sides of point 37. The several sections making up the die plate are secured to the entry or strainer plate 22 as by studs 48 (see FIG. 2) penetrating chamfered openings 49 in the entrance plate and secured in threaded openings 51 of the die plate sections. The die orifice is in communication with an upper continuous dough-receiving cavity 50 (see FIG. 2) of greater width than the associated die orifice, the width of the cavity, however, varying in correspondence with the variations in the width of the die orifice.

Referring now particularly to FIG. 3, entrance or strainer plate 22 is provided with double rows of the circular dough-transmission openings 26. As previously mentioned, the dough-transmission openings provide communication between the space above the plate 22 and the underlying dough cavity 50. The pattern of the transmission openings corresponds to the pattern of the underlying cavity and the die orifice of the die plate 24. The dough-transmission area or volume provided by the openings at any point of the pattern varies in somewhat general correspondence to the variation in width of the underlying dough cavity and die orifice. Thus, in the particular embodiment disclosed, from a midpoint 52 at the lower side of the pattern, as viewed in FIG. 3, and preceding in both directions to points 54 and 56 respectively, openings of the outer row 57 are of substantially the same diameter and suitably of the same spacing. However, from points 54 and 56 to an upper midpoint 58, the openings of the outer row are of smaller diameter and are spaced further apart than the preceding openings of the outer row. On the other hand, the inner row of openings leading in both directions from lower midpoint 52 to upper midpoint 58 are of uniform size and spacing. At point 60, which overlies the portion of the die orifice which defines the so-called "knot" of the pretzel, openings are omitted as it has been found that there is sufficient endwise movement of the dough in the several arms of cavity 50 of the underlying die plate, which substantially meet at this location, to provide the quantity of dough required to produce a "knot" of the desirable relatively greater width, but at the same time, of no greater thickness than the adjacent portions of the dough configuration. The dough entrance openings 26 overlying the cavity and die portions 44 and 46, which define the "legs" of the pretzel, are in double rows but are of relatively smaller diameter as compared to the openings 26 in other portions of the dough entrance plate.

In the operation of an extrusion apparatus incorporating a die head having dough entrance and die plates as described above, the material to be extruded, such as a pretzel dough, is delivered through chamber 10 and under substantially uniform pressure to the entrance plate 22 of the die head 18. The dough is forced through the dough openings 26 of the entrance plate and into cavity 50 and from the cavity is forced through the die orifice 36. Due, however, to the greater resistance to the flow of the dough through the dough-transmission openings in those locations where the openings have a lesser delivery capacity, due to their smaller diameter and/or greater spacing, the pressure on the dough in the underlying cavity at, and leading to, such locations will be reduced. As a result, during a given time interval of flow, as determined by the frequency of the cutting strokes of the cut-off knife 20, a lesser thickness of extruded dough will be obtained at and adjacent such locations. By employing a particular arrangement of the transmission openings, such as previously described, the dough extrusion will be thinner in parts of the pretzel shape where the extrusion is also narrower.

During the transmission of the dough shapes from the point of extrusion and cut-off to the baking chamber, the dough rises, as previously pointed out. With proper correlation of the width and thickness of the dough, it will, during the rising operation, assume substantially a circular cross-section which, due to the general correspondence between the width and thickness of the dough, will vary in diameter in different parts of the pretzel configuration. Consequently, a pretzel 61, as shown in FIG. 5, having portions of different cross-sectional area, as illustrated in FIGS. 6 and 7, may be produced by the extrusion method, which pretzels heretofore could be produced only by first forming the dough into a length of varying diameter and thereafter twisting the length by hand or machine into the pretzel configuration.

I claim:

1. In an apparatus for producing units of extrudable material comprising a die head having entrance and exit sides, means for feeding an extrudable material, such as a pretzel dough, to the entrance side of said die head, and means for severing extruded material delivered at the exit side of said die head, the improvement wherein the die head comprises a die plate including an extended die orifice having portions varying in width, a cavity in said die plate leading to said die orifice and of greater width than said die orifice, and a dough entrance plate overlying said die plate and having a pattern of dough-transmission openings leading to said die cavity, and means providing a varied capacity of said openings to deliver extrudable material to said die cavity in general correspondence with the variations in width of said die orifice.

2. In an apparatus for producing units of extrudable material comprising a die head having entrance and exit sides, means for feeding an extrudable material such as a pretzel dough to the entrance side of said die head, and means for severing extruded material delivered at the exit side of said die head, the improvement wherein the die head comprises a die plate including an extended die orifice having portions varying in width, a cavity in said die plate leading to said die orifice and of greater width than said die orifice, and a dough entrance plate overlying said die plate and having a pattern of dough-transmission openings leading to said die cavity, certain of said openings varying in cross sectional area and frequency with openings of smaller cross sectional area and frequency at locations corresponding to portions of said die orifice of lesser width than other portions.

3. A die head for use in apparatus for producing units of an extrudable material such as a pretzel dough, the die head having entrance and exit sides, the improvement wherein the die head comprises a die plate including an extended die orifice having portions varying in width, a cavity in said die plate leading to said die orifice of greater width than said die orifice, and a dough entrance plate overlying said die plate and having a pattern of dough-transmission openings leading to said die cavity, and means providing a varied capacity of said pattern of dough-transmission openings to delivery extrudable material to said die cavity in general correspondence with variations in the width of said die orifice, said last-named means comprising variations in the cross sectional area and spacing of certain of said openings of said pattern.

* * * * *